United States Patent Office 3,823,074
Patented July 9, 1974

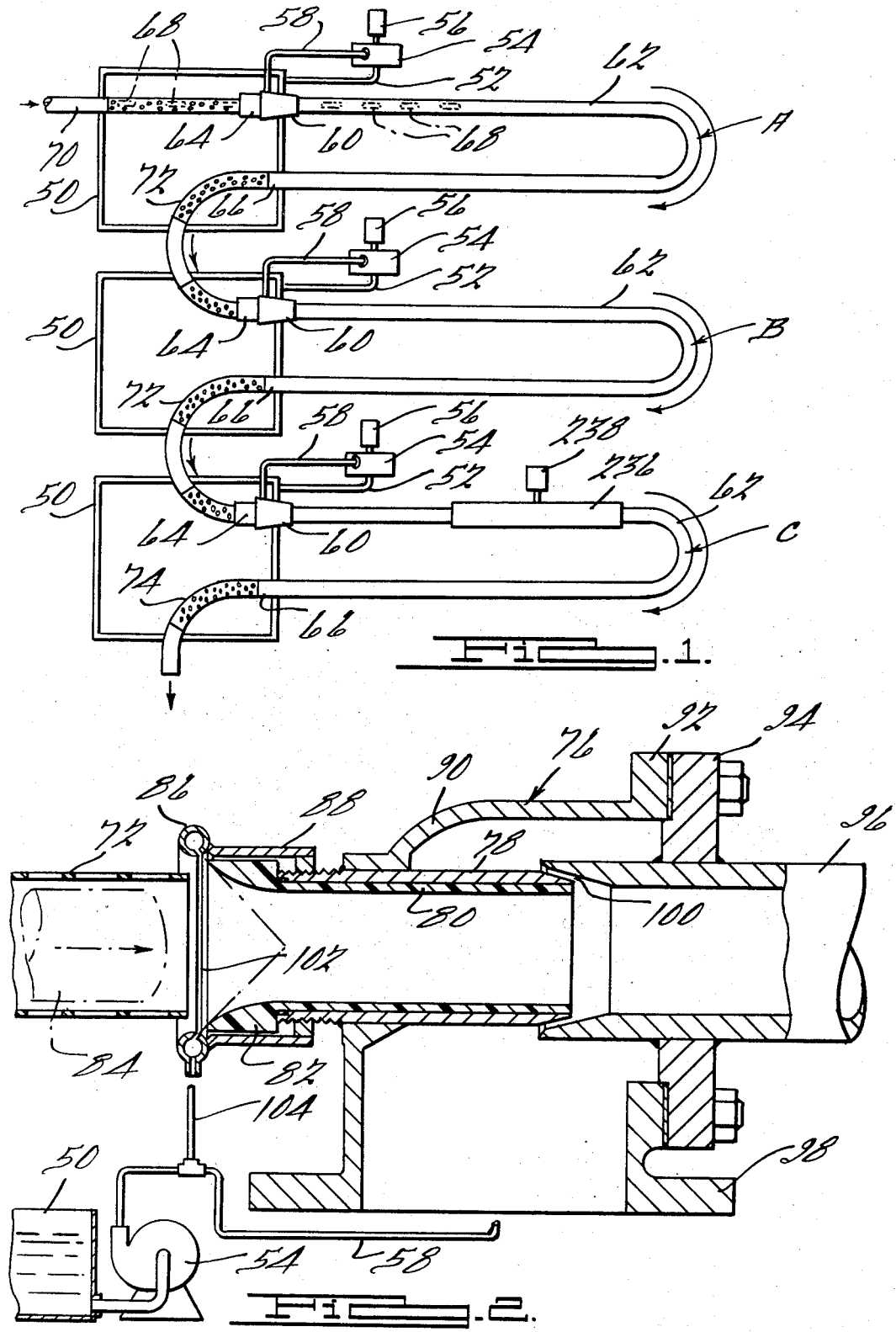

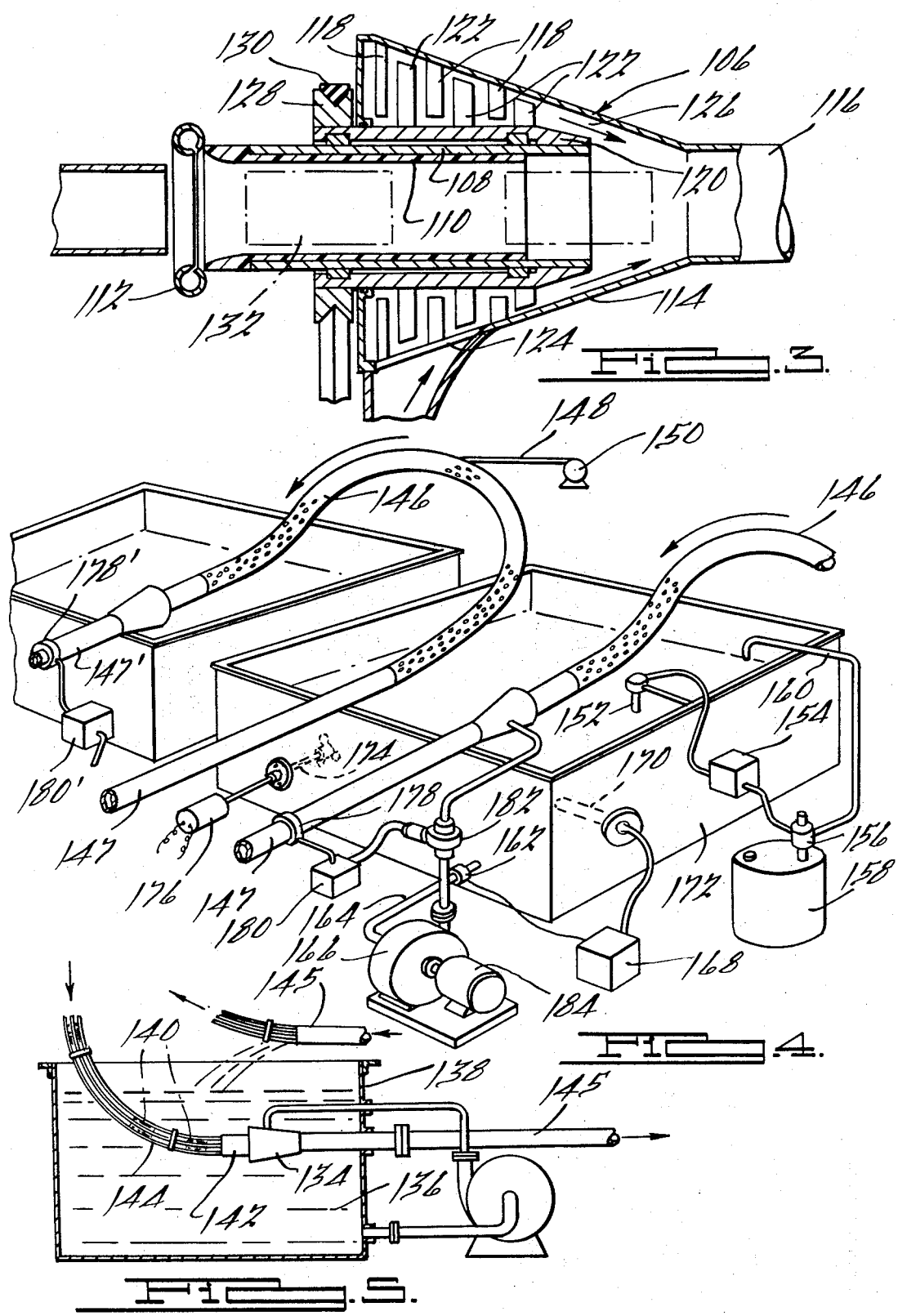

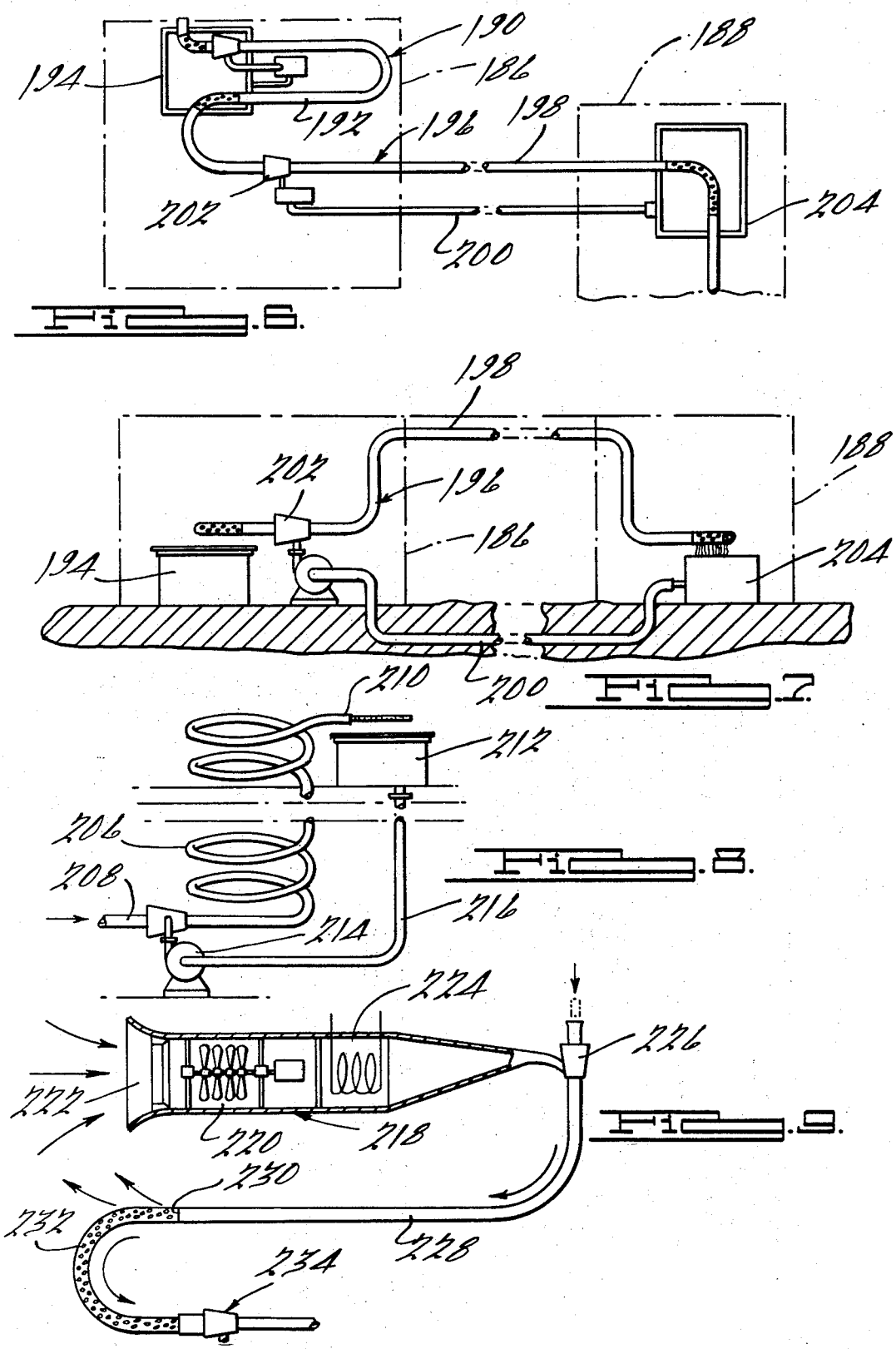

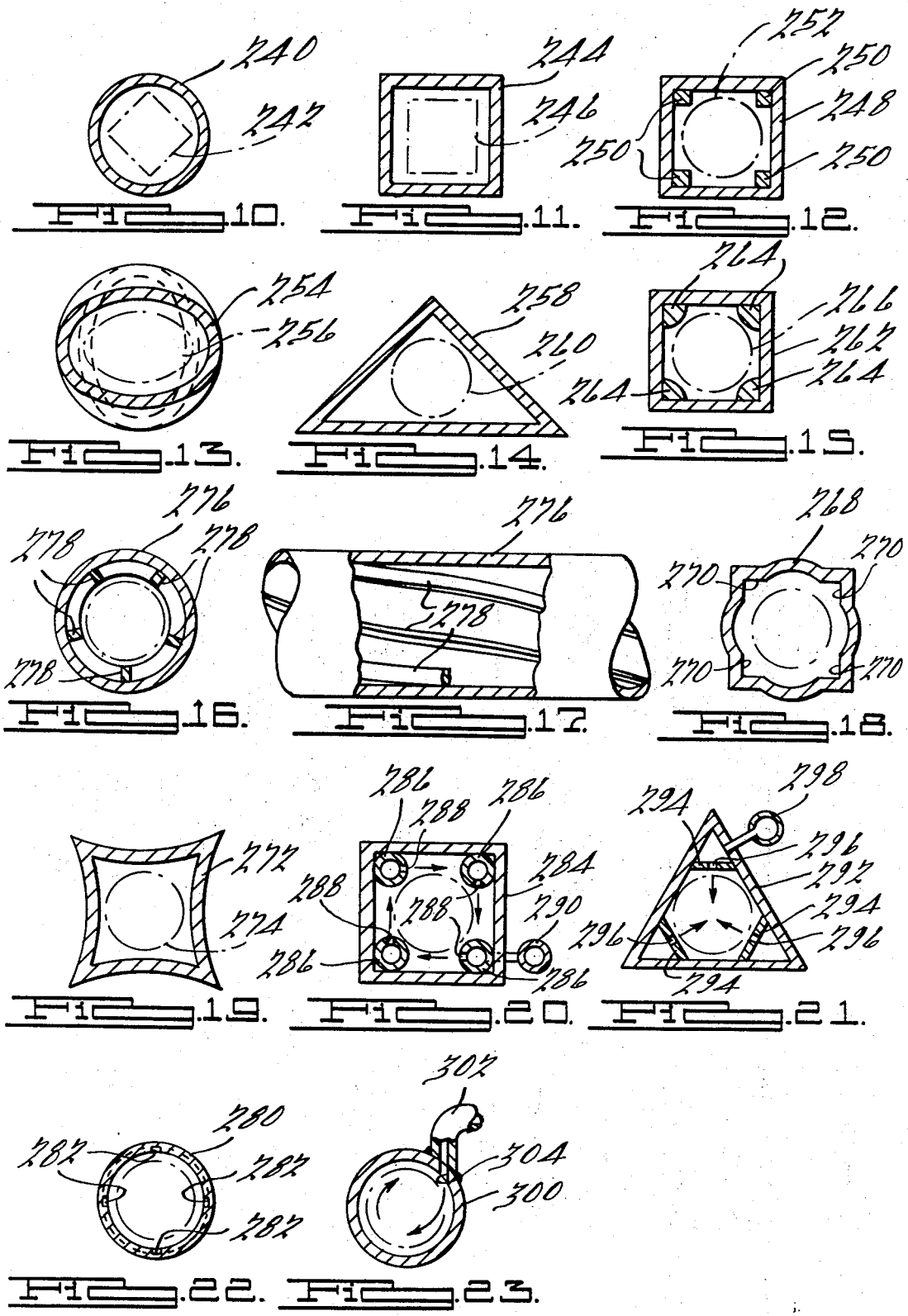

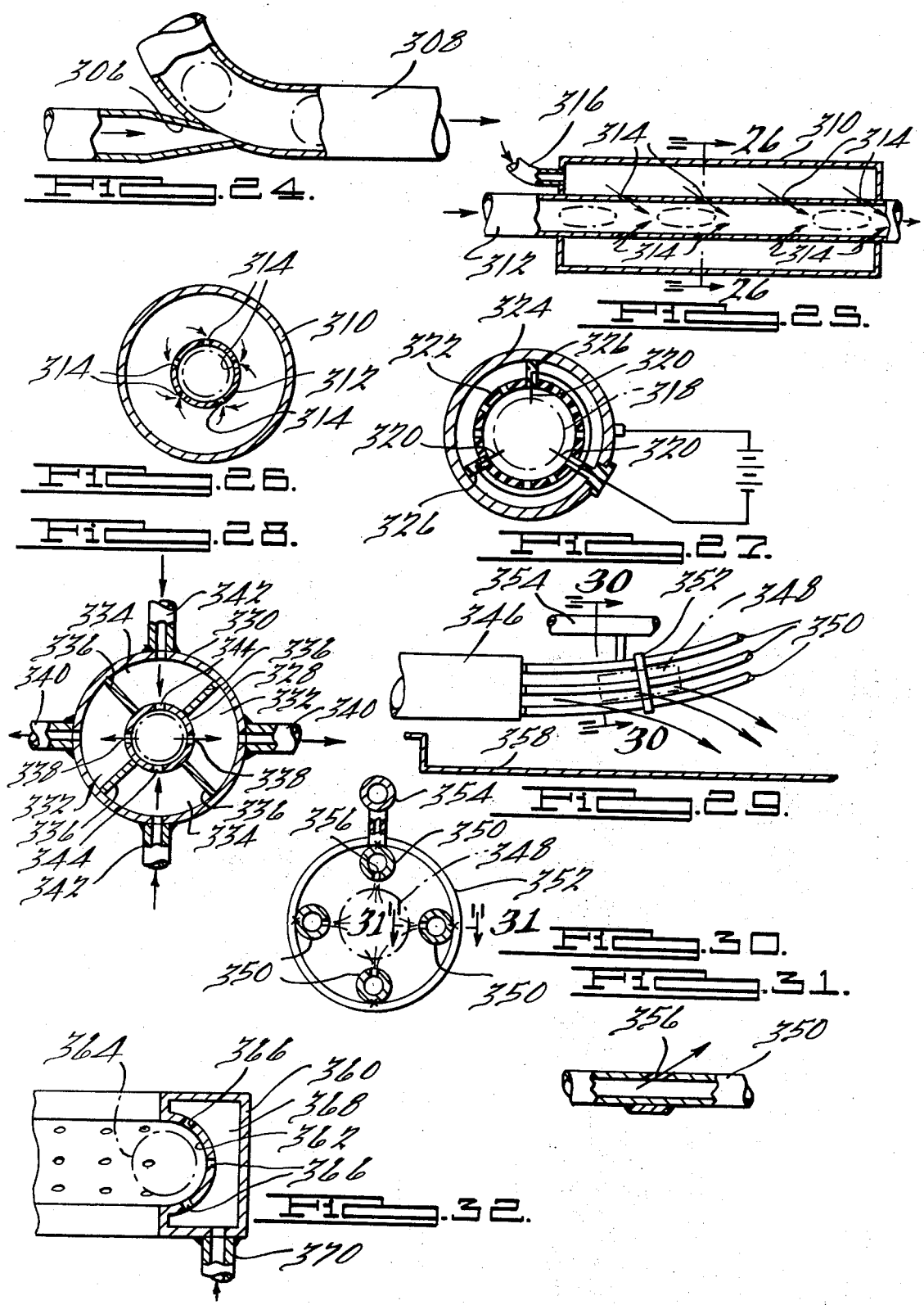

3,823,074
METHOD FOR ELECTROPLATING WORKPIECES
Louis J. Minbiole, Jr., Detroit, Chester G. Clark, Grosse Pointe Woods, and John W. Neumann, Birmingham, Mich., assignors to Oxy Metal Finishing Corporation, Warren, Mich.
Original application Nov. 12, 1968, Ser. No. 774,923, now Patent No. 3,664,354. Divided and this application Mar. 6, 1972, Ser. No. 231,951
Int. Cl. C23b 5/08
U.S. Cl. 204—23    4 Claims

ABSTRACT OF THE DISCLOSURE

A method for simultaneously treating and conveying workpieces and an apparatus for practicing the method by which a rapidly moving confined stream of a treating fluid is formed into which workpieces are introduced for entrainment and conveyance thereby and are subsequently extracted from the stream and thereafter successively introduced, if desired, into separate succeeding streams in an ordered sequence, thereby performing a multiple-stage treatment of the workpieces.

BACKGROUND OF THE INVENTION

This is a division of application Ser. No. 774,923, filed Nov. 12, 1968, now U.S. Pat. 3,664,354.

A variety of apparatuses and methods have heretofore been used or proposed for use for conveying individual workpieces through one or a plurality of work stations at which any one of a variety of work operations or chemical treatments are performed thereon. In apparatuses of the foregoing type, the individual workpieces are conventionally mounted on a suitable work supporting rack and are conveyed in that form from one station to the next adjacent work station. Smaller workpieces, due to the difficulty in mounting them individually on such work racks, are ordinarily processed in bulk quantities by loading them into suitable work containers or barrels which in turn are transported in sequence through the work stations.

In processes by which the workpieces are subjected to one or more treatments by immersion in a treating fluid, it has been conventional to provide one or a plurality of treating receptacles or tanks, each containing the desired treating fluid, into which the workpieces are successively immersed during the course of their travel through the process. Apparatuses typical of those employed for this purpose conventionally include a framework having supporting rails thereon on which work carriers are movably mounted and which in turn support the work racks or barrels containing the workpieces.

It will be apparent that the combination of the machine structure and the series of treating receptacles requires a relatively expansive plant site to adequately accommodate the treating apparatus and the ancillary equipment associated therewith. It will further be apparent that in apparatuses of the foregoing type, the manual or mechanical loading and unloading of the workpieces and the batchwise processing thereof constitutes a tedious and time-consuming operation requiring a substantial investment in capital equipment and plant facilities to achieve high production capacities. Processing apparatuses of the foregoing type are also characterized as having a large number of moving parts, requiring frequent service to maintain satisfactory performance particularly when such machines are employed in corrosive atmospheres.

In accordance with the method and apparatus comprising the present invention, many of the problems and disadvantages of the processing machines and techniques heretofore known are overcome by providing a substantial simplification of the apparatus and providing a degree of processing flexibility and versatility heretofore unattainable in processes and apparatuses of the types heretofore known.

SUMMARY OF THE INVENTION

The benefits and advantages of the present invention are achieved by an apparatus for effecting a treatment of workpieces which comprises an elongated conduit provided with means for introducing a treating fluid into the conduit for rapid flow therethrough and means for introducing workpieces into the stream of treating fluid, effecting an entrainment thereof in the stream and achieving thereby a simultaneous treatment and conveyance of the workpieces. The workpieces are extracted from the conduit at a point downstream from the point of their introduction and are separated from the treating fluid which in turn is preferably recirculated to the inlet of the conduit. The velocity of the treating fluid and the length of the conduit are correlated so as to provide a desired duration of treatment of workpieces while entrained in said trating fluid. In addition, the configuration of the conduit can be of any one of a variety of shapes in order to provide optimum utilization of plant space, as well as for providing a discharge of the workpieces at a desired location relative to their point of entry into the conduit.

In order to achieve a multiple-stage treatment of workpieces, the workpieces are discharged from one conduit at a point adjacent to the inlet of a second conduit, through which a separate treating fluid is circulated and through which the workpieces are sequentially transferred in a prescribed sequence. The entire treatment of the workpieces can be achieved by employing one or a plurality of such conduits or, alternatively, a portion of the treatment can be achieved employing the apparatus and method comprising the present invention and the balance thereof by conventional processing equipment as may be desired or required in any particular instance, thereby achieving optimum processing flexibility and economy.

Further advantages and benefits of the present invention will become apparent upon a reading of the description of the preferred embodiments taken in conjunction with the accompanying drawings.

BRIEF DESCRIPTION OF THE DRAWINGS

FIG. 1 is a schematic plan view of a series of interconnected return-type processing apparatuses constructed in accordance with a preferred embodiment of the present invention;

FIG. 2 is a magnified longitudinal vertical sectional view through an inductor suitable for introducing a workpiece into the inlet end of a conduit and illustrating schematically the associated piping for supplying the treating fluid thereto;

FIG. 3 is a longitudinal vertical sectional view of an alternative axial pump adapted to serve as an inductor or an in-line fluid booster;

FIG. 4 is a fragmentary perspective view of the apparatus shown in FIG. 1 adjacent to the treating fluid storage reservoir;

FIG. 5 is a fragmentary side elevational view, partly in section, of an alternative satisfactory disposition of an inductor submerged below the level of a treating fluid in the reservoir;

FIG. 6 is a schematic plan view of an alternative satisfactory arrangement of the apparatus shown in FIG. 1, wherein one of the conduit sections is arranged with the inlet end and the outlet end remotely disposed from each other;

FIG. 7 is a schematic side elevational view of the apparatus shown in FIG. 6 with the conduit and fluid return lines at different elevations;

FIG. 8 is a schematic fragmentary side elevational view illustrating an apparatus wherein the conduit is disposed in the form of a helix;

FIG. 9 is a schematic side elevational view of an apparatus in which air is employed as a treating fluid such as for performing a drying operation on the workpieces and wherein the conduit is arranged to provide for gravitational assistance in effecting movement of the workpieces therethrough;

FIGS. 10 through 15, inclusive, are transverse cross sectional views illustrating alternative cross sectional configurations of the processing conduits;

FIG. 16 is a transverse cross sectional view of a conduit formed with a plurality of radial inwardly projecting vanes on the interior surface thereof for imparting directional guidance to the treating fluid passing therethrough;

FIG. 17 is a fragmentary side elevational view partly in section illustrating the spiral configuration of the vanes of the conduit illustrated in FIG. 16;

FIG. 18 is a transverse vertical sectional view through a conduit configuration of still another alternative configuration;

FIG. 19 is a transverse vertical sectional view of still another alternative conduit configuration;

FIG. 20 is a vertical transverse sectional view through a conduit provided with a plurality of longitudinally extending conduits disposed in each corner thereof having a series of apertures along the length thereof for introducing a fluid into the interior of the conduit;

FIG. 21 is an alternative satisfactory cross sectional configuration of a conduit of the type shown in FIG. 20;

FIG. 22 is a transverse vertical sectional view of a conduit formed with a plurality of helical grooves extending along the internal surface thereof for imparting a controlled flow pattern to the treating fluid passing therethrough;

FIG. 23 is a transverse vertical sectional view of a conduit provided with a supply tube terminating in a jet for introducing a treating fluid into the interior of the conduit in a tangential direction;

FIG. 24 is a fragmentary side elevational view partly in section illustrating the provision of a nozzle at a point along the length of the conduit for introducing additional treating fluid into the interior of the conduit;

FIG. 25 is a fragmentary longitudinal view partly in section of a conduit formed with a manifold therearound from which a supplemental treating fluid is adapted to be injected into the interior of the conduit through a series of angularly oriented nozzles;

FIG. 26 is a transverse vertical sectional view of the conduit and manifold arrangement shown in FIG. 25 and taken substantially along the line 26—26 thereof;

FIG. 27 is a transverse vertical sectional view through a conduit incorporating a perforated insulating sleeve and electrodes for contacting metallic workpieces to effect an electrification thereof during at least a portion of their travel through the conduit;

FIG. 28 is a transverse vertical sectional view through a conduit and encircling manifold which is compartmentalized so as to enable the introduction of a treating fluid into the interior of the conduit and a concurrent withdrawal of a treating fluid from the interior of the conduit;

FIG. 29 is a fragmentary side elevational view of an alternative construction of the outlet end of a conduit for effecting an extraction of a workpiece from the treating fluid;

FIG. 30 is a transverse vertical sectional view of the apparatus shown in FIG. 29 and taken substantially along the line 30—30 thereof;

FIG. 31 is a fragmentary longitudinal horizontal sectional view through one of the guide conduits shown in FIG. 30 and taken substantially along the line 31—31 thereof;

FIG. 32 is a fragmentary transverse vertical sectional view of an alternative arcuate guide shoe for guiding workpieces around the turnaround portion of an apparatus from the outlet end of one conduit to the inlet end of an adjacent conduit;

DESCRIPTION OF THE PREFERRED EMBODIMENTS

Figure 33:
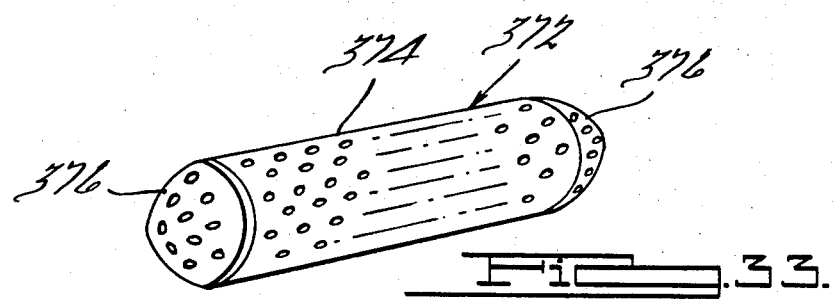
FIG. 33 is a perspective view of a typical carrier in which one or a plurality of workpieces can be placed for conveyance and treatment in the apparatus.

Referring now in detail to the drawings and as best seen in FIG. 1, the processing apparatus of the present invention is comprised of three individual sections, each having a separate treating fluid through which suitable workpieces are advanced, effecting a successive treatment thereof. In the specific embodiment illustrated in FIG. 1, each of the three sections of the apparatus, indicated as A, B and C, is comprised of a receptacle or tank 50 which serves as a reservoir for the treating fluid, which in this particular instance is a liquid. A suction line 52 is connected to the tank 50 for withdrawing the treating therefrom and supplying it to the inlet side of a centrifugal-type pump 54, which is driven by a pump motor 56.

The pressurized treating fluid is discharged from the pump 54 through a pressure line 58 which is connected to an inductor 60 mounted on a conduit 62 which is of a generally U-shaped configuration and is typical of a so-called return-type arrangement in which an inlet end 64 of the conduit 62 is disposed adjacent to an outlet end 66 of the conduit.

A series of workpieces 68, as indicated in phantom, are continuously supplied through a suitable supply chute 70 into the inlet end 64 of the conduit and thereafter are entained in the treating fluid and are conveyed or transferred in the direction of the arrow through the conduit and are subsequently discharged from the outlet end 66 thereof. The outlet end 66 of each conduit is disposed above the respective tank 50 such that the treating fluid discharged from the outlet end 66 thereof returns to the tank and is recirculated by means of the pump 54 back to the inductor and through the conduit. The workpieces 68, on the other hand, are transferred by means of an arcuate transfer chute 72 from the outlet end 66 of one conduit to the inlet end 64 of the next adjacent conduit. In accordance with the arrangement as illustrated in FIG. 1, the workpieces are successively transferred through each of the three sections of the processing apparatus, thereby achieving a successive treatment by each of the three treating fluids contained in the receptacles or tanks 50.

It will be appreciated that a greater or lesser number of individual conduit sections can be provided as may be desired or required to effect an appropriate treatment of the workpieces. One or more sections of the apparatus can be coordinated with the operation of conventional mechanical processing devices of the types heretofore known so as to provide a selected portion of a total multiple stage work operation or treatment on the workpieces in order to achieve optimum processing flexibility and economy. In this regard, the supply chute 70 may be directly connected to the output end of a processing machine or fabricating apparatus whereafter the workpieces undergo a single or multiple stage treatment in one or more sections of the apparatus as illustrated in FIG. 1. Upon emergence from the last section C of the apparatus, the workpieces are conveyed by means of a discharge chute 74 for further processing, assembly, packaging or the like.

It will be apparent from the apparatus as illustrated in FIG. 1 by varying the nature of the treating fluid, the cross sectional and longitudinal configuration of the processing conduit, the velocity of the treating fluid, the length of the conduit, and the number of individual treating sections, any one of a variety of metallic and non-metallic workpieces can be processed in a high speed continuous manner while effecting a concurrent conveyance thereof through the several process sections enabling an almost unlimited degree of versatility and flexibility.

Workpieces of a variety of different types can be processed in accordance with the present invention. The only limitation as to the workpieces that can be satisfactorily handled is in their size and in their configuration to facilitate convenient handling thereof in conduits of reasonable size employing feasible treating fluid flow velocities. Accordingly, cylindrical workpieces of a circular, rectangular, square or irregularly-shaped cross section, either solid or hollow, can be processed, as well as spheres, cup-shaped articles, small stampings and the like. Ordinarily, the workpiece is of a size so as to enable unrestricted passage through the conduit including any bends or other arcuate convolutions formed therein. Workpieces which are of a generally cylindrical configuration are conventionally introduced into the inlet of the conduit such that their longitudinal axis is disposed in alignment with the longitudinal axis of the conduit, whereby the object is entrained by the treating fluid and remains in the longitudinally-oriented position throughout its travel. Irregularly-shaped workpieces, on the other hand, may be introduced into the inlet of a conduit in random orientation and workpieces of relatively small size can be introduced into the conduit in random orientation and conveyed through the conduit in the form of a slurry in which a plurality of the small workpieces are entrained and suspended in the treating fluid. The workpieces can also be mounted on or disposed within suitable carriers or containers to facilitate their handling and processing as may be desired.

The treating fluid itself may comprise a gas or liquid, as well as combinations thereof, to achieve an appropriate treatment of the workpieces. Treating fluids of a two-phase composition include, for example, liquids incorporating bubbles of gas therein, gases or liquids incorporating solid particles therein, as well as liquid emulsions consisting of two or more immiscible liquids. Gaseous treating fluids may also comprise vapors of volatile liquids, such as organic cleaning solvents, as well as conventionally gaseous materials such as heated air, for example, serving as a drying media.

When a multiple section apparatus is employed for performing a sequential treatment of the workpieces, each conduit is supplied with a separate treating fluid to effect the prescribed treatment of the workpieces during the course of its travel from the inlet end to the outlet end of the conduit.

The variety of workpieces and treating fluids as hereinabove discussed render the apparatus and process comprising the present invention applicable for achieving a wide range of different treatments of the workpieces, such as electrolytic treatments, chemical treatments, coating treatments, mechanical treatments, as well as electromechanical treatments. Of the foregoing, chemical treatments are particularly suitable which broadly include the various chemical treatments of the types heretofore known and as performed by conventional apparatuses and techniques of the prior art. Examples of such feasible chemical treatments include chemical cleaning, chemical conversion coatings including chromate and phosphate coatings, acid pickling, rinsing, immersion-type coatings; etching; electroless coatings such as, for example, copper, chromium, silver, nickel, cobalt, etc.; chemical drying employing an organic solvent such as trichloroethylene; impregnation; leaching; dyeing and the like. Electrolytic treatments of metallic workpieces can also be achieved, such as electroplating employing a suitable electrolyte, as well as electro-cleaning in which the workpieces are electrified during at least a portion of their travel through the processing conduit. The application of decorative and protective coatings can also be achieved by employing treating fluids consisting of the coating substance itself or latices or emulsion-type coating liquids effecting the deposition of an appropriate coating on the exposed surfaces of a workpiece.

Various mechanical treatments can also be performed on the surfaces of workpieces, such as an abrasive surface finishing treatment, by employing a treating fluid incorporating abrasive particles suspended therein which perform an abrasive finishing operation on the workpiece surfaces as a result of their impingement thereagainst during the course of the travel of a workpiece through a processing conduit. Various electromechanical processing treatments are also feasible utilizing induction and dielectric heating techniques of the types well known in the art for effecting a heating of the workpieces during the course of at least a portion of their travel through the conduit while immersed in a treating fluid media of the desired type and composition. Similarly, a drying of the surfaces of a workpiece can be accomplished during the course of their transit through a processing conduit while in contact with a treating fluid such as heated air for effecting a vaporization and removal of the liquid deposits thereon. Coatings can also be applied to the surfaces of workpieces by the fluidized bed technique to which a plurality of particles are fluidized in a gaseous stream through which the workpieces are passed, effecting the deposition of the particles on the surfaces thereof forming a coating.

Typical of the several multiple-stage treating operations that can be practiced in accordance with the apparatus of the present invention is an electroplating operation in which the workpieces are first subjected to a precleaning operation employing a suitable organic or aqueous cleaning solution to remove any surface contaminants therefrom, followed thereafter by an acid neutralization or activating step, if required, with an intervening and subsequent aqueous water rinse and deionized water rinse as may be required. Following the precleaning and rinsing phase, the workpieces are electroplated in a processing conduit incorporating a suitable electrolyte and in which the workpieces are electrified, effecting the deposition of a preselected metallic coating on the surfaces thereof. The workpieces thereafter undergo a rinse and subsequent post-treatment as may be desired consistent with the specific metal and type of plating deposited thereon. The electroplating operation can be conducted in accordance with any of the well-known types which conventionally are applied employing mechanical processing equipment with stationary treating receptacles through which the workpieces are sequentially conveyed in accordance with the prior art.

Referring now to the drawings, an inductor 76 is illustrated which is constructed in accordance with a preferred embodiment of the present invention and which is particularly suitable for processing workpieces that approach the size of the processing conduit through which a liquid treating fluid is circulated. As shown in FIG. 2, the inductor 76 comprises a tubular sleeve 78 having a liner 80 of a low friction material, such as a polytetrafluoroethylene plastic, disposed within the interior thereof and which liner is formed with a tapered inlet portion 82 to facilitate entry of workpieces 84 into the inductor. The workpieces 84 are adapted to be guidably conveyed to the inlet of the tubular sleeve 78, such as by means of a transfer chute 72 or a discharge chute as previously described in connection with FIG. 1. A manifold ring 86 encircles the tapered inlet portion 82 of the liner 80 and is mounted in appropriate concentric relationship therewith by means of a collar 88 threadably secured on the peripheral threaded portion of the tubular sleeve 78.

The tubular sleeve 78 is appropriately supported by a housing 90 which is formed with an annular flange 92 at its forward or right-hand end, as viewed in FIG. 2, to which a flange 94, encircling a pipe 96, is sealingly attached. The pipe 96 is adapted to be secured to or may be integrally formed with the processing conduit. The lower portion of the housing 90, as viewed in FIG. 2, is also flanged at 98 to which a suitable supply conduit, such as the pressure line 58 as previously described in connection with FIG. 1, is secured for supplying a treating fluid to the interior of the housing. The tubular sleeve 78 and pipe 96 are formed with conforming tapered edges at their adjacent ends, defining therebetween an annular tapered nozzle 100. In accordance with this arrangement, the treating fluid from the reservoir 50, as schematically illustrated in FIG. 2, is transferred by the pump 54 via the supply line 58 to the interior of the housing 90, which defines a chamber disposed in communication with the inlet of the annular nozzle 100. The fluid is discharged through the annular nozzle in the form of a high pressure cone, effecting a filling of the pipe 96 therewith and creating a suction at the inlet of the tubular sleeve, which is operative to draw the workpiece 84 longitudinally inwardly of the inductor. The annular nozzle can also be provided with angular vanes to deflect the fluid discharged so as to impart a helical flow pattern to the fluid which is preferred in some instances depending on the particular workpieces and treating fluids employed.

In order to facilitate the movement of a workpiece into the inductor, the manifold ring 86 is provided with a circular angularly inclined nozzle 102 which serves to direct a jet of treating fluid on the interior surface of the liner, forming a low friction fluid film on which the workpiece is movably supported. The treating fluid is supplied to the manifold ring 86 by means of a supply line 104 which is connected to the pressure line 58 connected to the output of the pump.

An alternative satisfactory inductor 106 is illustrated in FIG. 3, which is operable for the same purposes as previously described in connection with the inductor 76 illustrated in FIG. 2. The inductor 106 similarly includes a tubular sleeve 108 having a liner 110 on the inner surface thereof for guidably supporting and receiving workpieces 132 from a suitable supply chute. A manifold ring 112 is positioned adjacent to the inlet end of the tubular sleeve 108 to provide a fluid film on the surface of the liner, minimizing frictional resistance.

The inductor 106 includes a housing 114 which terminates at its output or right-hand end, as viewed in FIG. 3, in a pipe 116 which corresponds to the processing conduit to which the workpieces and treating fluid are circulated. A series of stator blades 118 is affixed to and project radially inwardly of the housing 114. A plurality of turbine blades 122 are affixed to and project radially outwardly of a cylindrical hub 120 which is rotatably journaled around the tubular sleeve 108. The forward or right-hand end of the tubular sleeve 108 and liner 110 are formed with an angular chamber which generally conforms with the tapered configuration of the inner surface of the housing 114, defining therebetween an annular nozzle 126, through which the treating fluid is discharged in the form of a cone. The hub 120 and the turbine blades 122 thereon are rotatably driven by means of a pulley 128 affixed to an outer extension of the hub, around which a V-belt 130 is trained and is suitably driven by a motor (not shown). The treating fluid enters the inductor housing by means of a supply port 124 and in accordance with the arrangement illustrated is pumped under high pressure by the turbine blades 122 out through the annular nozzle 126.

It will be appreciated that the inductor 76, illustrated in FIG. 2, and the inductor 106, shown in FIG. 3, can also be employed at one or more points along the length of the processing conduit to effect a boost in the pressure and/or velocity of the treating fluid, as well as to impart a desired flow pattern or turbulence to the fluid passing therethrough. The inductors 76 and 106 are also applicable for use in a manner as illustrated in FIG. 1 in which the inductors are disposed above the level of treating fluid in the tanks 50, as well as in a manner as illustrated in FIG. 5, wherein an inductor 134 is immersed in and submerged below the level of a treating fluid 136 in a tank 138. In the arrangement as illustrated in FIG. 5, workpieces 140, shown in phantom, are introduced to an inlet end 142 of the inductor by means of a supply chute 144, which passes downwardly and beneath the level of the treating fluid. The workpieces are conveyed after induction through a suitable processing conduit 145 and are returned at a location above the tank 138 at which the workpieces are disengaged from the treating fluid which is discharged into the tank.

A preferred arrangement of the transfer conduits is illustrated in FIG. 4 in which the transfer conduits 146, which are of a perforated construction to enable the escape of the treating fluid, are arranged in a generally U-shaped configuration and curve upwardly from the axis of a processing conduit 147 to facilitate a disengagement of the workpieces from the treating fluid. In order to facilitate conveyance of the workpieces through the transfer conduits 146 and to also effect an acceleration thereof, facilitating disengagement of the treating fluid, one or more nozzles 148 can be affixed to the conduit for discharging pressurized air against the workpieces to propel them through the transfer conduit. The nozzles 148 are connected to a suitable pressurized source of air, such as the compressor 150 schematically shown in FIG. 4.

FIG. 4 also illustrates control devices which can be conveniently incorporated in the apparatus for assuring a proper coordinated functioning of several sections of the apparatus, as well as maintaining the particular treating fluids within a prescribed range of composition and temperature. One such control device is schematically indicated at 152 in FIG. 4, which comprises an electrode for measuring the electrical conductivity of the treating fluid which, in this instance, is a liquid solution containing dissolved substances which render the solution electrically conductive in proportion to their concentration. The electrode 152 may be of any one of the various types known which may either intermittently or continuously sense the conductivity of the solution which in turn is a function of the concentration of the dissolved material in the treating fluid. The electrode or conductviity cell 152 is connected to a suitable control box 154, which contains suitable circuitry including means for preselecting a desired concentration range expressed in terms of solution conductivity. When the conductivity cell reflects a solution conductivity below such a preset level, the control box 154 is operative to effect the energization of a suitable metering pump 156 which is mounted on a container 158 containing a concentrated makeup solution which thereby is pumped from the container through a supply line 160 and is added to the treating solution. In accordance with this and equivalent arrangements, the concentration of the treating fluid is maintained within a prescribed preselected range, assuring uniformity in the treatment to which the workpieces are subjected during their course of travel through the processing conduit 147.

Similarly, the treating fluid can be maintained at a preselected temperature by means of a suitable temperature sensing device located at a convenient point in the processing conduit or supply conduits for sensing the temperature of the treating fluid which in turn is communicated to a control box which regulates the amount of heating and/ or cooling to which the treating fluid is subjected. An arrangement of this type is illustrated in FIG. 4 consisting of a suitable thermocouple schematically illustrated at 162, which is mounted in a suction line 164 leading to the inlet of the centrifugal pump 166. The thermocouple 162 is in turn connected to a control box 168, which includes presettable means therein of any of the types well known in the art and which means are operative to effect an energization or de-energization of a suitable immersion-type heater 170, which is mounted on a side wall of a tank 172 containing the treating fluid. Any one of the variety of heating and cooling devices of the types well known in the art can be employed in combination with the temperature sensing and control device in order to maintain the solution at a preselected temperature in order to assure the maintenance of optimum processing conditions of the workpieces entrained in the treating fluid.

The uniformity of the composition and temperature of the treating fluid within the tank 172 can also be assured by employing a suitable agitator such as the propeller-type agitator 174 projecting inwardly through the tank wall and driven by a motor 176. The type of agitator employed and the degree of agitation to which the treating fluid is subjected will vary depending upon the particular temperature and composition characteristics of the fluid, as well as whether it is of a single or two-phase mixture, the latter requiring a higher degree of agitation.

The flow rate or velocity of the treating fluid passing through the processing conduit 147 can also be conveniently maintained within preselected limits by means of a suitable flow measuring device, schematically indicated at 178 in FIG. 4, such as a magnetic flow meter of the types well known in the art. The flow measuring device 178 can also be employed for counting or indicating the rate of workpieces passing through the conduit which is useful in establishing and maintaining an appropriate spacing between successive workpieces being processed. The flow meter 178 can be suitably connected to a control box 180 which incorporates suitable presettable limit means therein of the type well known in the art which, in response to a flow velocity above or below the prescribed limits, is operative to energize a suitable motorized valve 182, effecting an appropriate opening or closing movement thereof to correspondingly increase or decrease the treating fluid supplied from the pump 166 to maintain the flow rate within the prescribed limits. Alternatively, the control box 180 can be directly connected to a variable speed type motor 184 coupled to the pump 166 to effect a corresponding increase or decrease in the speed of rotation of the pump and corresponding changes in the output thereof.

The provision of a flow control mechanism in the processing apparatus is important in order to assure that the workpieces will receive a uniform treatment in each processing conduit. The length of the conduit, the velocity of the treating fluid and the specific composition thereof are correlated so as to assure that each workpiece is subjected to a predetermined immersion time period while entrained in the treating fluid in order to effect the proper degree of treatment thereof. In addition, the control of the treating fluid flow is important in assuring the maintenance of the desired production capacity of the apparatus and the sensing of the workpiece flow rate enables the maintenance of a substantially uniform and optimum spacing between adjacent workpieces.

In apparatuses comprising a series of individual processing sections, such as the sections A, B and C illustrated in FIG. 1, the rate of treating fluid flow in each section is controlled so as to be at least equal to and preferably slightly greater than the flow rate in the preceding section to avoid any buildup or jamming of workpieces between successive treating sections. This is conveniently achieved, as shown in FIG. 4, by providing a similar flow measuring device indicated at 178' in a processing conduit 147' of the next downstream processing section which similarly is connected to a control box 180' that is preset to assure a fluid flow and workpiece travel rate at least equal to the workpiece flow rate in the processing conduit 147 of the preceding processing section.

As previously mentioned, the avoidance of any buildup of workpieces in the transfer conduits 146 is achieved by the provision of the nozzles 148 which are also useful for effecting an acceleration of the velocity of the workpieces to correspond with the increased processing velocity in the next adjacent processing section.

The wide latitude afforded in the design and plant layout by the processing apparatus comprising the present invention is typified by the arrangements as schematically illustrated in FIGS. 6–8. As shown in FIGS. 6 and 7, one or more portions or sections of the processing apparatus can be conveniently housed in an area or building encompassed by the dotted line indicated at 186 and succeeding portions or sections of the apparatus can be incorporated in a second area or building encompassed by the dotted line indicated at 188. As indicated in FIGS. 6 and 7, the area 186 accommodates a processing section 190 which is of the return-type and includes a U-shaped process conduit 192 having its inlet and outlet ends disposed adjacent or proximate to each other and above the treating fluid reservoir 194. The second process section 196 has one portion thereof housed in the area 186 and another portion housed in the area 188 with the connecting processing conduit 198 and treating fluid recirculation return line 200 interconnecting these two portions. As will be noted, the inlet of the conduit 198 adjacent to the inductor 202 is disposed remotely from its outlet positioned above a tank or reservoir 204 in the area 188. In accordance with this arrangement, the process section 196 serves the dual function of effecting a transfer or conveyance of the workpieces from one plant site to a second plant site located remotely therefrom, while concurrently effecting a treatment of the workpieces during their conveyance.

The latitude provided in selecting the particular location and disposition of the process conduits and return lines is also illustrated in FIG. 7, wherein the process conduit 198 is schematically shown as being placed in an elevated position which may correspond, for example, to a position between the rafters of an overhead roof structure, while at least a portion of the recirculation return line 200 may be disposed under the ground, rendering the surface unobstructed for efficient utilization by other equipment. In processing sections of a return-type similar to that illustrated in FIG. 1, each of the return-type process conduits may themselves be disposed beneath ground level such that only the inlet and outlet portions thereof adjacent to the treating fluid reservoirs are accessible, thereby substantially reducing the required plant space. The balance of the processing conduits can, for example, extend outwardly of the building structure housing the treating fluid reservoirs and may extend underground under a parking lot or driveway surrounding such plant structure.

It will also be appreciated that variations in the specific configuration and convolutions of the processing conduits can be made so as to enable their installation in confined existing plant facilities in which mechanical processing equipment of the types heretofore known cannot be accommodated. Typical of one such variation providing for a more compact configuration of the processing conduit is that as schematically illustrated in FIG. 8. In the arrangement as illustrated, a processing conduit 206 is formed in a spiral or helical pattern, effecting an upward conveyance of workpieces from an inlet end 208 thereof to an outlet end 210 disposed at a desired vertically-spaced position from the inlet. The treating fluid discharged from the outlet end 210 is received in a reservoir tank 212 and is recirculated back to a pump 214 through a return line 216 for recirculation through the processing conduit. In a similar manner, concurrent conveyance and treatment of workpieces can be achieved in a downward direction in which event the transfer of the workpieces is assisted by gravity.

The foregoing description regarding the process apparatus as illustrated in FIGS. 1 through 8 has been primarily applicable to apparatuses employing a liquid as a treating fluid. FIG. 9 illustrates an apparatus in which gas, and in particular, air, is employed as the treating fluid such as for effecting a drying of the workpieces at the completion of or preliminarily to the next process operation. As shown in FIG. 9, an axial flow compressor 218 is provided having a blower section 220 containing a plurality of turbines for drawing air inwardly through an inlet 222. A heating section 224 is provided at the discharge end of the blower section for effecting a heating of the air to an elevated temperature to enhance its drying capacity. Thereafter, the compressed and heated air is discharged into an inductor 226, effecting an entrainment and conveyance of a workpieces through a processing conduit 228. The proces conduit 228 is of an L-shaped configuration in which gravitational assistance is provided to effect a conveyance of the workpieces during a portion of their travel through the conduit. The heated air containing any evaporated material from the workpieces is discharged at the outlet end 230 of the process conduit and the dried workpieces are thereafter transferred such as by means of a perforated transfer duct 232 to a second process section indicated at 234. All or a portion of the discharged air can be recirculated to the compressor as may be desired.

In the processing of certain workpieces, it may be desirable to effect a heating thereof during at least a portion of their travel through a processing conduit or during their transfer from the outlet end of one conduit to the inlet end of the next succeeding process conduit. Ordinarily such heating can be conveniently achieved by controlling the temperature of a particular treating fluid employed in a manner as previously described. Independent or supplemental heating of such workpieces can also be achieved as schematically illustrated in FIG. 1 by a heating device indicated at 236 in process section C which is disposed along a portion of the length of the process conduit 62. The heating device 236 may be, for example, of a dielectric or induction type in accordance with known prior art constructions and may suitably be controlled by means of a control panel 238 to attain the appropriate degree of heating of the workpieces passing therealong.

The process conduits themselves may be of any one of a variety of different cross sectional configurations which may remain constant throughout the length of the process conduit or may vary in shape along different sections thereof and/or may be provided with an axial twist so as to attain a desired fluid flow velocity and/or flow pattern. Typical of various conduit cross sectional configurations suitable for the apparatus of the present invention are those as illustrated in FIGS. 10–15, 18 and 19. As shown in FIG. 10, a process conduit 240 is shown having a circular cross sectional configuration through which a rectangular-shaped workpiece, illustrated in phantom at 242, is adapted to be transferred. A substantially square cross sectional configuration of a conduit 244 is illustrated in FIG. 11 in which a square workpiece 246 is shown in phantom. A conduit 248 also of a substantially square cross sectional configuration is illustrated in FIG. 12, which is provided with rectangular rail 250 in each of the corners thereof, providing a cross sectional opening of a cross-shaped configuration in which a circular workpiece 252, indicated in phantom, is adapted to be conveyed.

Still another satisfactory alternative configuration of a conduit is illustrated in FIG. 13, wherein a conduit 254 is of an elliptical cross sectional configuration through which a workpiece 256, as shown is phantom, is adapted to be transported. The conduit 254 is shown as having an axial twist therein to provide a desired variation in fluid flow pattern. A triangular-shaped conduit 258 is shown in FIG. 14 for processing workpieces 260, shown in phantom. A conduit configuration similar to that illustrated in FIG. 12 is shown in FIG. 15 in which a conduit 262, having a square-shaped cross section, is provided with a plurality of corner rails 264 having inner surfaces which are of a substantially circular convex configuration. The rails 264 facilitate the guidance of a workpiece 266, as shown in phantom, as well as providing directional guidance of the treating fluid passing therethrough.

A conduit 268 of a substantially circular cross section is illustrated in FIG. 18 which is provided with V-shaped grooves or slots 270 at substantially equal circumferentially-spaced intervals therearound. A conduit 272 is illustrated in FIG. 19 having a cross sectional configuration as defined by four arcuate side walls defining a generally square-shaped cross section in which a workpiece indicated in phantom at 274 is adapted to be conveyed and treated.

Each of the conduit cross sectional configurations as illustrated in FIGS. 10–15, 18 and 19 are characterized as providing a desired treating fluid flow pattern and cross sectional area for accommodating workpieces of a desired size and configuration to achieve optimum fluid entrainment and treatment characteristics. Further directional guidance or controlled fluid flow patterns can be achieved by providing means along at least a portion of the inner surface of the processing conduits which are adapted to impart turbulence or selected localized flow patterns in the treating fluid during its travel through the conduit. Typical of one such arrangement is that as illustrated in FIGS. 16 and 17 in which a process conduit 276 which is of a generally circular configuration is provided with a plurality of inwardly directed vanes or ribs 278 which are oriented in the form of a helix, thereby imparting a spiral flow pattern to a treating fluid passing therethrough. A desired variation in the flow pattern characteristics is also achieved by the arrangement illustrated in FIG. 22 in which a processing conduit 280 is provided with a series of rectangular-shaped grooves 282 which extend in the form of a helix along at least a portion of the inner surface of the conduit.

Selected variations in the flow pattern of the treating fluid can also be achieved by introducing supplemental portions of the treating fluid or other fluids at selected locations along the length of the conduit which also can be employed for effecting a boost in the velocity and/or pressure of the treating fluid at desired intervals along the longitudinal length of the conduit. Typical of such arrangements are those illustrated in FIGS. 20, 21 and 23. In the specific embodiment as illustrated in FIG. 20, a conduit 284 of a generally square-shaped cross sectional configuration is provided with tubular rails 286 of a circular cross section, each formed with a plurality of jets or apertures 288 disposed at spaced intervals therealong which are oriented so as to discharge a supplemental treating fluid in the directions indicated by the arrows. The supplemental treating fluid is supplied to the tubular rails 286 by means of a suitable supply header 290, which is disposed in communication with the outlet of the main or auxiliary pump supply. The introduction of such supplemental treating fluid to the interior of the conduit by means of the jets 288 imparts a circular clockwise movement to the treating fluid passing downwardly through the conduit.

A similar conduit arrangement is illustrated in FIG. 21 in which a conduit 292 of a generally triangular cross sectional configuration is provided with longitudinally extending partitions 294 disposed in each of the corners thereof formed with jets 296 for directing a supplemental treating fluid radially inwardly of the center of the conduit. The chambers defined by the partitions 294 and the adjacent side walls of the corners of the conduit 292 are disposed in communication with a suitable supply header 298 through which the pressurized supplemental treating fluid is supplied.

Still another arrangement is shown in FIG. 23 in which a conduit 300 of a generally circular configuration is provided with a nozzle 302 at one or a plurality of locations along the length thereof and which nozzle is formed with a tangentially-oriented jet 304, through which a supplemental treating fluid is introduced imparting a clockwise flow component as indicated by the arrows to the treating fluid passing through the conduit. The nozzle 302 is adapted to be connected to a suitable pressurized supply source of the supplemental treating fluid.

In some instances, particularly when conduits of considerable length are employed to achieve the appropriate treatment of the workpieces, a boost in the fluid velocity and/or pressure is required in order to maintain the appropriate correlation between fluid flow and treatment time. One such arrangement is illustrated in FIG. 24 in which a nozzle 306 is disposed with its outlet end in communication with the interior of a processing conduit 308 for introducing a supplemental treating fluid to the interior of the processing conduit, effecting a boost in its pressure and velocity. An alternative satisfactory manner for introducing substantial quantities of supplemental treating fluid is illustrated in FIGS. 25 and 26 in which a concentric manifold 310 is disposed around the periphery of a processing conduit 312 and wherein the processing conduit is provided with a plurality of angularly-oriented apertures or nozzles 314 through which the supplemental treating fluid is discharged. The interior of the manifold 310 is disposed in communication with a supply line 316, through which a pressurized supply of the supplemental treating fluid is conveyed for discharge through the nozzles 314. It will be appreciated that the particular orientation of the axes of the nozzles 314 can be varied so as to provide the requisite or desired flow pattern, e.g., a helical pattern, in the treating fluid passing through the processing conduit, as well as to achieve the desired velocity and/or pressure boost.

As previously mentioned, in such process treatments in which an electrification of the workpieces is required, a conduit arrangement such as illustrated in FIG. 27 can be provided. As shown in FIG. 27, a workpiece, indicated at 318 and shown in phantom, is adapted to be electrified by a series of inwardly extending electrodes or contacts 320 for rendering the workpiece anodic or cathodic, as may be desired. The workpiece itself is confined within a perforated sleeve 322 of an insulating material which in turn is centrally positioned within the interior of the conduit 324 by means of radially extending vanes 326. The conduit 324 which may be of a metallic composition or which may be provided with an electrically conductive inner surface is similarly electrified, effecting a migration of ions and a conducting of electrical current through the conductive treating fluid in order to achieve the desired workpiece treatment.

It is desirable in some processing systems to remove all or a portion of the treating fluid at a point intermediate of the length of the processing conduit and effect a replacement or replenishment thereof with the same or different treating fluid. A construction which enables such a partial substitution of treating fluids is illustrated in FIG. 28. As shown, a processing conduit 328 is enclosed within a manifold 330 which is divided into two pairs of fluid-tight compartments 332, 334 by means of partitions 336. A series of apertures 338 are formed in the conduit 328 which are disposed in communication with the interior of the compartment 332. Suction lines 340 are connected to the compartment 332 for the purpose of withdrawing treating fluid from the interior of the conduit through the apertures 338 and the compartments 332.

A replenishment of the treating fluid withdrawn from the conduit 328 is achieved by supply lines 342 connected in communication with the compartments 334 for supplying a pressurized treating fluid thereto. A plurality of apertures 344 are provided in the conduit which are disposed in communication with the interior of the compartments 334 through which the pressurized replenishing fluid enters the interior of the conduit 328.

An alternative construction of the transfer and discharge chutes 72, 74, as illustrated in FIG. 1, for transferring workpieces from the outlet to the inlet of adjacent processing sections is illustrated in FIGS. 29–31. As shown, the transfer chute is positioned in alignment with the outlet end of a conduit 346 for receiving a workpiece indicated at 348 in phantom. The transfer chute is comprised of a plurality of circumferentially-spaced tubular rails 350 which are maintained in appropriate position by means of a strap 352 rigidly affixed to the rails at longitudinally-spaced intervals. The number and particular spacing of the tubular rails is dictated by the size and configuration of the workpieces to be processed in order to assure appropriate guidance of the workpieces therealong.

At least some of the tubular rails 350 are connected to a supply header 354 for supplying pressurized air thereto which in turn is discharged through a plurality of angularly-oriented nozzles 356 formed at spaced intervals along the length of the tubular rails. The nozzles 356 can be arranged so as to provide for an acceleration of the workpieces as they are discharged from the outlet end of the conduit 346 facilitating a disengagement of the treating fluid therefrom, which returns to the storage reservoir 358 as fragmentarily shown in FIG. 29. The pressurized jets of air discharged from the angular nozzles 356 also serve to maintain the workpiece in at least partially spaced relationship from the surfaces of the tubular rails, thereby minimizing frictional contact therebetween and facilitating workpiece transfer.

An alternative arrangement from that shown in FIGS. 29–31 is illustrated in FIG. 32 in which a transfer chute 360 is illustrated which is formed with a semi-circular trough 362 in one side face thereof, within which workpieces 364 are guided during their arcuate travel between the outlet of one processing conduit to the inlet of the next adjacent processing conduit. The workpieces are maintained in guided relationship within the trough 362 by means of the centrifugal force of the workpieces during their arcuate travel. In order to minimize sliding friction between the periphery of the workpiece and the adjacent surface of the trough 362, a series of angularly-oriented nozzles 366 are formed in the trough which are disposed in communication with a pressurized compartment 368 of the transfer chute. Pressurized air is supplied to the compartment 368 by means of a supply conduit 370 which in turn is discharged through the nozzle 366, forming a floating film of air on which the workpieces ride, as well as preventing a reduction in velocity of the workpieces or an acceleration thereof as may be desired.

As previously stated, any one of a variety of workpieces can be processed in accordance with the present invention including workpieces which are of a size approaching the cross-sectional size of the processing conduit, as well as small workpieces which are entrained in the treating fluid in the form of a slurry. In some instances, depending on the particular process treatment and the configuration and/or size of the workpieces, it is desirable to mount the workpieces in a suitable capsule or carrier, indicated at 372 in FIG. 33, which is transferred through one or a plurality of processing sections. The capsule 372, as shown in FIG. 33, is of a perforate structure to facilitate unrestricted flow of the treating fluid through the cylindrical center section 374, as well as hemispherical end walls 376 thereof. The capsule is provided with a removable section, such as one of the end walls 376, to provide access to the interior thereof during a loading and unloading of the workpiece or workpieces therefrom.

Figure 34:
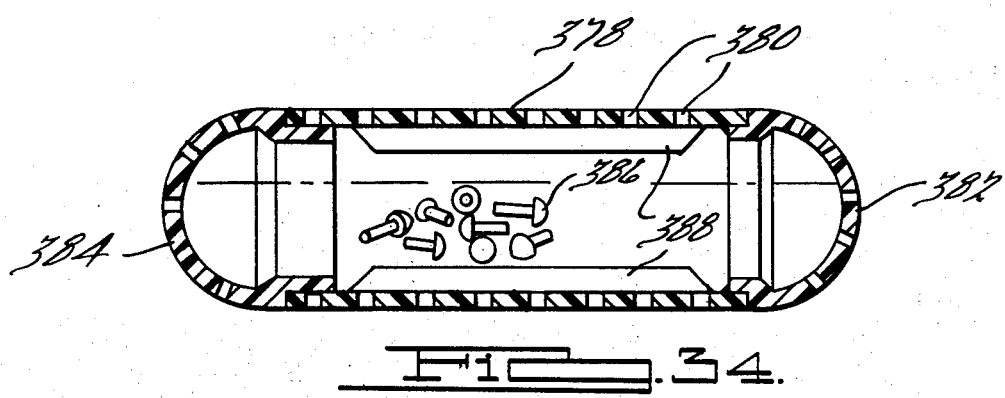
FIG. 34 is a longitudinal sectional view of a carrier as shown in FIG. 33 containing a plurality of small workpieces.

A typical use of the capsule 372 for transporting small workpieces is illustrated in the embodiment shown in FIG. 34. As shown, the capsule comprises a tubular central section 378 which is provided with a plurality of perforations 380 therethrough, to one of the ends of which a hemispherical end wall 382 is securely fastened. A removable hemispherical cap 384 is frictionally engaged to the opposite end of the central section, which can readily be removed for inserting and removing workpieces, such as the fasteners 386, from the interior of the capsule. As will be further noted, one or a plurality of tumbling ribs 388 can be affixed to the interior surface of the central section at circumferentially-spaced intervals therealong to facilitate agitation of the workpieces by imparting a tumbling action thereto in response to the rotation of the capsule during its travel through a processing conduit. The end walls of the capsule are similarly provided with perforations 380 to provide substantially unrestricted flow of treating fluid into and out of the capsule, assuring uniform treatment of the workpieces contained therein.

The capsule itself may be composed of any suitable material which is resistant to and compatible with the treating fluids coming in contact therewith. Any one of a variety of synthetic plastics can be satsifactorily employed for this purpose, such as those used in fabricating the processing conduits.

Figure 35:
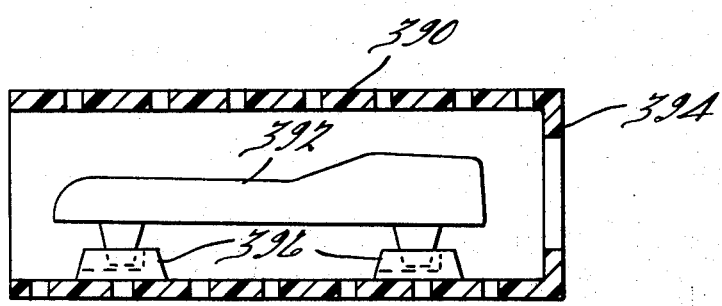
FIG. 35 is a longitudinal sectional view of an alternative carrier on which a single workpiece is removably mounted.

In addition to the capsules illustrated in FIGS. 33 and 34, a suitable carrier or sled 390 can also be employed for removably supporting a workpiece, such as the workpiece 392 shown in FIG. 35. In the arrangement as shown, the carrier consists of a substantially cylindrical tubular perforated side wall having an integrally-formed rim or flange 394 projecting radially inwardly of one end thereof. A pair of mounting posts 396 are affixed to the inner surface of the carrier for removably engaging depending sections of the workpiece 392, maintaining it in appropriate centralized disposition within the interior of the carrier. Alternative carrier configurations can be employed on which one or a plurality of workpieces can be mounted to facilitate their transport and treatment through one or more processing sections.

It will be apparent from the foregoing description that the processing apparatus or individual processing sections of a multiple-section apparatus can be varied to achieve the desired flow characteristics and treatment of workpieces transferred therethrough. The conduits through which the workpieces and treating fluid are circulated may be of metal or extruded plastic materials, such as polyvinyl polymers and copolymers, enabling the formation of relatively intricate cross sectional configurations which may further include vanes or grooves on the inner surfaces thereof to impart a degree of fluid flow control as may be desired. The flexibility and versatility inherent in the apparatus and method as herein described enables the use of any one or combinations of a variety of treating fluids, the velocities of which can be adjusted so as to provide a streamlined or turbulent flow pattern through the processing conduits which can be modified as desired by suitable devices for imparting a desired variation in flow pattern and turbulence. Further variations of the apparatus and method as hereinbefore described can be made without departing from the spirit of the invention.

What is claimed is:

1. The method of treating workpieces which comprises the steps of forming a plurality of separate confined streams of treating fluid, each stream composed of a separate treating fluid for performing a separate treatment with at least one of said streams being of a composition effective to apply a coating on the surfaces of the workpieces, successively introducing each workpiece into each stream in a preselected sequence and extracting the workpiece from each said stream thereby effecting a simultaneous plural treatment and conveyance of each workpiece during its travel while entrained in each stream, and maintaining each workpiece in each said stream for a period of time sufficient to perform a desired treatment thereof and to apply a desired thickness of the coating on the surfaces of each workpiece while entrained in the one said stream.

2. The method as defined in claim 1, in which the treating fluid of the one said stream comprises an immersion plating solution for forming a coating comprising a plating deposit on the surfaces of the workpieces.

3. The method as defined in claim 1, in which the treating fluid of the one said stream comprises an electroless plating solution for forming a coating comprising a plating on the surfaces of the workpieces.

4. The method as defined in claim 1, in which the treating fluid comprising the one said stream consists of an electrolyte and including the further step of electrifying a workpiece during at least a portion of its travel while entrained in the one said stream.

References Cited

UNITED STATES PATENTS

| | | | |
|---|---|---|---|
| 3,137,645 | 6/1964 | Vaughan et al. | 204—129.6 |
| 3,616,423 | 10/1971 | Faust | 204—198 |
| 3,577,324 | 5/1971 | Patterson | 204—20 |
| 3,420,766 | 1/1969 | Michelson | 204—201 |
| 3,397,126 | 8/1968 | Gilbert | 204—23 |
| 1,997,458 | 4/1935 | Ehrhardt | 204—11 |
| 1,466,582 | 8/1923 | Dietzel | 204—201 |
| 521,991 | 6/1844 | Sachs et al. | 204—10 |

FOREIGN PATENTS

| | | | |
|---|---|---|---|
| 176,774 | 4/1966 | U.S.S.R. | 204—23 |
| 6712385 | 3/1968 | Netherlands | 204—23 |

OTHER REFERENCES

Metal Finishing Guidebook Directory, 1968, 36th Ed., Metals & Plastics Publications, Inc., pp. 489–496.

JOHN H. MACK, Primary Examiner

R. L. ANDREWS, Assistant Examiner

U.S. Cl. X.R.

117—130 E; 134—26, 30, 32, 33, 36, 37; 148—6.14, 6.15, 6.2; 302—14, 17